United States Patent [19]
Knapp

[11] 3,911,951
[45] Oct. 14, 1975

[54] COCK FOR HYDRAULIC SYSTEMS, PARTICULARLY SUITABLE AS CUTOFF COCK

[76] Inventor: Alfons Knapp, Bleicherstrasse 3, Biberach an der Riss, Germany

[22] Filed: Oct. 23, 1974

[21] Appl. No.: 517,226

[30] Foreign Application Priority Data
Nov. 16, 1973 Italy.................................. 70368/73

[52] U.S. Cl................... 137/550; 251/333; 251/360
[51] Int. Cl.²......................................... F16K 31/50
[58] Field of Search ............ 137/549, 550; 251/214, 251/216, 333, 360

[56] References Cited
UNITED STATES PATENTS

| | | | |
|---|---|---|---|
| 2,566,609 | 9/1951 | Grosse.............................. | 137/549 X |
| 3,123,337 | 3/1964 | Peras................................... | 251/333 |
| 3,382,890 | 5/1968 | Howland.......................... | 251/360 X |

*Primary Examiner*—Henry T. Klinksiek
*Attorney, Agent, or Firm*—Young & Thompson

[57] ABSTRACT

A cutoff cock wherein a closure seat has an inner tapered protrusion surrounded by water passages and cooperating with an annular concave sealing valve, thus defining in the open position a passage without sudden variations of direction for the water; and wherein a filter member surrounds the valve for intercepting the particles entrained by the water.

6 Claims, 2 Drawing Figures

COCK FOR HYDRAULIC SYSTEMS, PARTICULARLY SUITABLE AS CUTOFF COCK

BACKGROUND OF THE INVENTION

The present invention relates to a cock for domestic or industrial hydraulic systems, of the type, often called cutoff cock, which is intended to generally remain in a open condition and to be closed in particular occasions, such as for example to allow repairs or maintenance, to insulate a fixture and so on.

In the known embodiments these cocks have near the water inlet end a fixed closure seat forming a bottleneck in the inner bore of the body of the cock, and cooperating with this seat is a valve having a conical convex face actuable by the opposite end of the body of the cock, while the delivery fitting extends transversally to the body. In operation, the flow of water which passes through the cock is again and again subject to direction variations in order to enable it to pass first into the interior of the seat and then around the valve and finally to reach to the interior of the body of the cock, from where the delivery fitting extends. These repeated deviations of the flow render noisy the operation.

In the more improved forms of these types of cock, the valve is carried at the end of an apertured tubular element, within which there is inserted a filter which has to be traversed by the flow of water, thereby intercepting the impurity particles which might be entrained by the flow. However the filter, since it is disposed inside the tubular element which in turn is internal to the bore of the body of the cock, must necessarily have a reduced diameter and consequently a reduced working surface and becomes easily obstructed.

Finally, since the closure seat is located at the inner end the bore of the cock body, its machining is not easy and is rather costly. Furthermore, the seat being fixed, when it wears down or is damaged it renders necessary to replace the whole body of the cock.

BRIEF SUMMARY OF THE INVENTION

It is an object of the present invention to provide a cock of the above-mentioned type, which is free from all or a part of the disadvantages described above.

The main characteristic of the cock according to the invention is that the closure seat has towards the inside of the body of the cock an impervious frusto-conically tapered protrusion, around which there are provided a series of passages for the water; cooperating with this frusto-conical protrusion is a valve having substantially the shape of a frusto-conically concave ring carried by a partially tubular element provided with apertures which communicate, inside the body of the cock, with the delivery fitting. In this way, the flow of water passes from the inlet fitting, through said series of passages, around the frusto-conical protrusion of the closure seat when the seat is open, laps on the valve having the shape of a frusto-conically concave ring and so reaches the interior of the tubular element and then the delivery fitting, without having been subject to any sudden variation of the direction and consequently without originating noise.

Said closure seat which comprises a protrusion surrounded by passages is preferably inserted, for instance threadedly, into the body of the cock, which facilitates and renders more economical the machining operations and furthermore allows, in case of the seat being damaged, to replace only the damaged seat instead of the whole body of the cock.

In the cases in which the cock must be provided with a filter, the latter, according to the invention, is formed by a tubular member inserted between the partially tubular element, which carries the ring-shaped valve, and the bore of the body of the cock, so that the diameter of the filtering surface is only a little smaller than the diameter of the bore of the body and the functional duration of the filter is increased, while with equal capacity of interception the filter causes smaller load losses.

BRIEF DESCRIPTION OF THE DRAWINGS

These and other characteristics of the cock according to the invention will be better understood from the following description of an illustrative and non limitative embodiment represented schematically in the accompanying drawings, in which.

DETAILED DESCRIPTION OF THE PREFERRED EMBODIMENT

Figure 1:
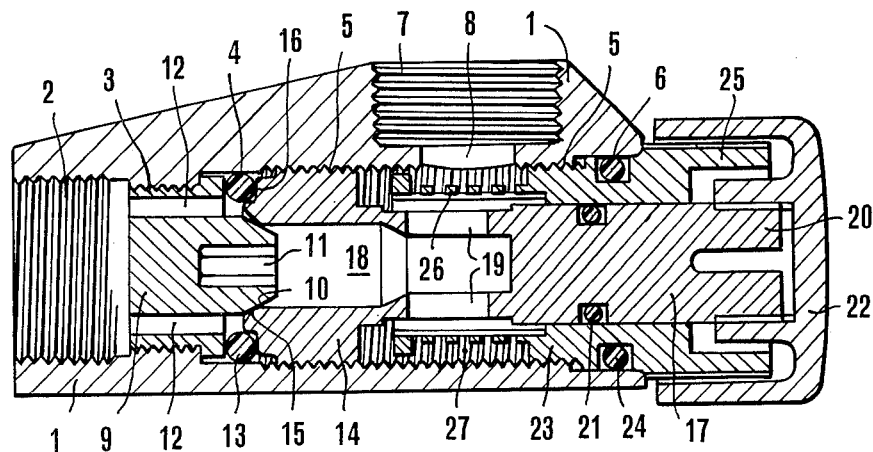
FIG. 1 is a longitudinal diametral section of the cock in its closure condition.

The body 1 of the cock is provided with a longitudinal bore formed of a plurality of successive portions, i.e.: a portion 2 forming an inlet fitting; a threaded portion 3 intended to receive the closure seat; a cylindrical portion 4 for a seal for the seat; a threaded portion 5 for the valve and the filter; and a cylindrical portion 6 for a seal in respect of the outside. Extending transversally at an intermediate region of the threaded portion 5 is a delivery fitting 7 which communicates through an aperture 8 with the longitudinal bore of the body. The very simple form of the body allows an easy manufacture of the same by moulding and the finishing of it on completely automatic machines.

The inserted seat 9 consists of a body threaded correspondingly to the portion 3 of the bore of the body 1 and has centrally, towards the inside of the body 1, a tapered frusto-conical protrusion 10 which may be provided with a profiled, for example hexagonal, dead cavity 11 for screwing the seat 9 into the body 1 by means of a key. Around the protrusion 10 the seat 9 is traversed by a plurality of passages 12 for the water.

The sealing of the seat 9 with respect to the body 1, which sealing is necessary only when the cock is in the closure position, can be obtained by means of an annular seal 13 inserted into the portion 4 of the bore of the body 1 and cooperating with the seat 9 and the respective valve, as will be explained later. This arrangement permits to avoid waste of radial space which would lead to an increase of the diameter of the body 1.

The valve has the shape of a hollow body 14 which is screwed into the portion 5 of the bore of the body 1 and terminates towards the seat 9 with a profiled face having an annular frusto-conical concave region 15 which is apt to provide closure on the frusto-conically tapered protrusion 10 of the seat 9, while a surrounding portion 16 of the valve simultaneously provides closure on the annular seal 13. In this way, when the portion 15 of the valve is closed on the protrusion 10, the annular seal 13 is compressed between the face of the valve 14, the seat 9 and the portion 4 of the bore of the body 1, thereby completing the sealing action.

As it is evident, the cooperating surfaces 10 and 15, which have been described as being frusto-conical, may also have any other equivalent shape, as for instance spheric, toric or the like, adapted to provide the necessary closure.

For the control of the valve, the body 14 extends from the side opposite the seat 9 in a tang 17 having an inner dead cavity 18 which is open inside the annular surface 15 and communicates with the outside through transversal openings 19 situated almost in line with the opening 8 of the delivery fitting 7. The tang 17 terminates with an indented and split portion 20 and is provided with a seal 21. On the end portion 20, which is indented and split and therefore somewhat resilient, may be inserted a control knob 22 which serves also as a cover, end portion 20 and knob 22 having complementary splines.

Inserted between the tang 17 and the bore of the body 1 is a filter which is constituted by a tubular member 23 screwed into the thread 5 of the bore and is provided with a seal 24 in order to provide a sealing in the portion 6 of the bore. Towards the outside the tubular member 23 terminates with a tubular head 25 which is indented for the control and normally is covered by the knob 22, which is rotatable relative to head 25; towards the inside the tubular member 23 presents a perforated portion 26 forming a filter, which disposes itself between the openings 19 of the tang 17 and the opening 8 of the delivery fitting 7. The diameter of the filtering portion 26 is slightly smaller than the diameter of the portion 5 of the bore of the body 1, such as to form an annular chamber 27 extending around the filter and communicating with the delivery fitting.

Figure 2:
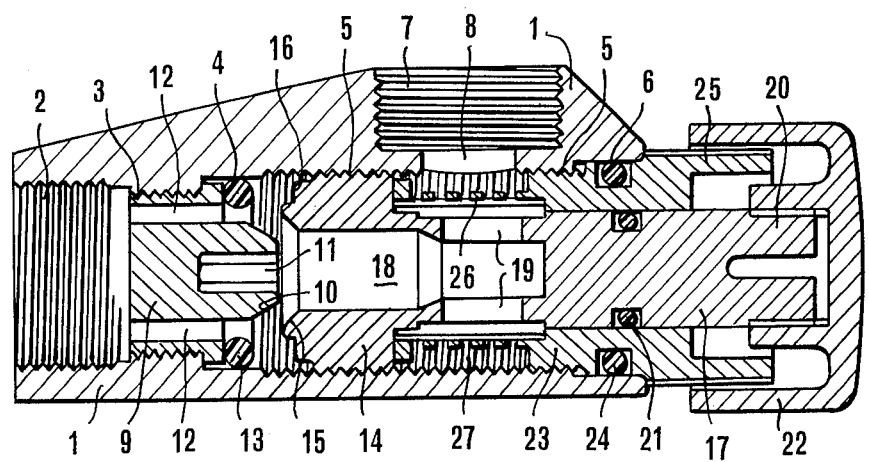
FIG. 2 is a sectional view similar to that of FIG. 1, but showing the cock in its open condition, i.e. in the condition of normal operation.

In the open condition (FIG. 2), the flow of water from the inlet fitting 2 traverses the passages 12 which choke it, then it passes between the surfaces 10 and 15, arrives into the cavity 18 and, through the openings 19 and the filter 26, reaches to the chamber 27, the opening 8 and finally the delivery fitting 7, without having been subject to any sudden deviation or throttling capable of producing noise.

In the closed condition of the cock (FIG. 1), the knob 22 may be removed and then the tubular member 23 with the filter 26 may be unscrewed by acting on the head 25, for the purpose of cleaning the filter, and thereafter mounted again, all these operations being performable with the maximum easiness and without using any instruments.

In case of the closure seat 9 being damaged, said seat, as any other part of the cock, may be unscrewed and replaced without having to detach the body 1 from the ducts for replacing it with another one.

Obviously various modifications of the executional particulars of what has been described and illustrated may be made without departing from the scope of the invention.

Having thus described my invention, what I claim is:

1. A cock for hydraulic systems comprising a body, in said body an inlet union, a delivery union and an inner cavity communicating with both said inlet and delivery unions, a seat member fixed in said inner cavity near said inlet union said seat member having opposite said inlet union a central impervious tapered protrusion and, around said protrusion, a number of through passages for water, and a valve member movable in said inner cavity between said seat member and said delivery union, said valve member having an annular concave sealing portion facing said seat member and cooperable with said tapered protrusion for intercepting the water flow, an inner bore opening in the center of said annular sealing portion and cross passages communicating said inner bore with said delivery union, whereby in the open position of the cock a passage for the water is defined between said tapered protrusion and concave sealing portion of the valve, said passage being free from sudden variations of the direction.

2. A cock as set forth in claim 1, wherein said seat member is removably screwed into said inner cavity of the body, and said protrusion has a substantially frusto-conical shape and has a central profiled cavity cooperable with a corresponding tool for screwing and unscrewing the seat member.

3. A cock as set forth in claim 1, wherein an annular seal member is inserted in said inner cavity of the body between said seat member and said valve member, said seal member having a thickness larger than the distance between said seat and valve members in the closed position of the cock.

4. A cock as set forth in claim 1, wherein said valve member is screwed into said inner cavity of the body and has a tang protruding opposite said annular sealing portion, a control knob being connected to said tang outside the cock body.

5. A cock as set forth in claim 1, wherein a tubular member is interposed between a portion of said valve member, wherein said cross passages are provided, and said inner cavity of the body, said tubular member being perforated to form a filtering portion at least in the region between said cross passages and said delivery union.

6. A cock as set forth in claim 1, wherein said valve member is screwed into said inner cavity of the body and has a tang protruding opposite said annular sealing portion, said cross passages being provided in correspondence of a portion of said fang, a tubular member is screwed into said inner cavity of the body surrounding said tang and has a perforated filtering portion surrounding said cross passages, said tubular member further having outside said cock body an indented tubular head, and a control knob is removably coupled with said tang and covers said tubular head.

* * * * *